Nov. 24, 1936.  W. A. EATON  2,062,089
CONTROL MECHANISM
Filed May 23, 1935
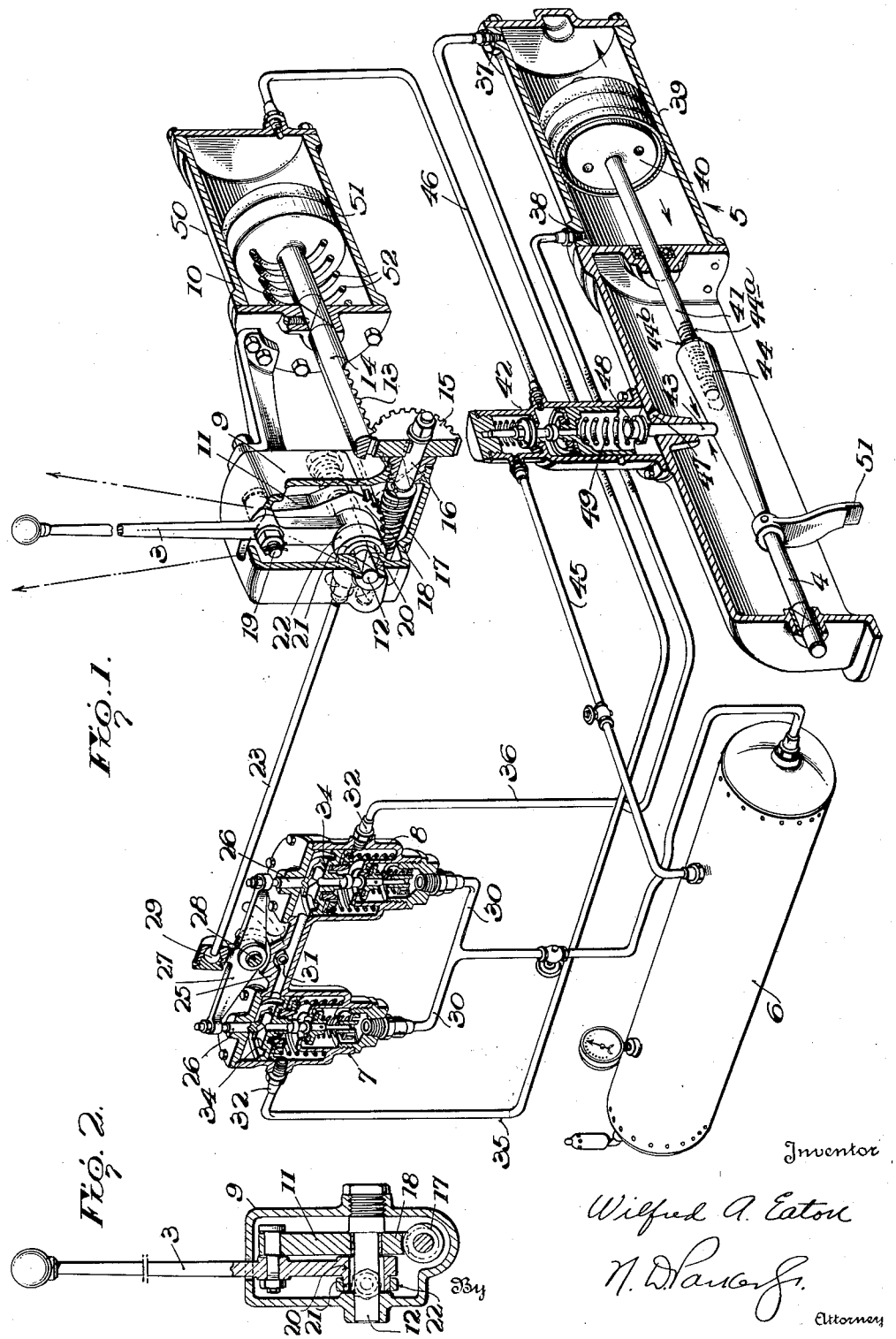

Patented Nov. 24, 1936

2,062,089

UNITED STATES PATENT OFFICE 2,062,089

CONTROL MECHANISM

Wilfred A. Eaton, Pittsburgh, Pa., assignor to Bendix-Westinghouse Automotive Air Brake Company, Pittsburgh, Pa., a corporation of Delaware Application May 23, 1935, Serial No. 23,102

13 Claims. (Cl. 121—41)

This invention relates to telemotors, and more particularly to telemotors for operating the shifting mechanism of automotive transmission devices.

In certain designs of motor vehicles, it is advantageous to locate the gearshift mechanism at a point remote from the control station of the vehicle. In such cases, it becomes necessary to employ some sort of remote control system, usually power operated, for operating the gearshifting mechanism. Such a system may, for example, comprise a control lever situated at the control station and adapted to be operated by the driver of the vehicle, and a follow-up power actuator adjacent the gearshift mechanism and connected to operate the shifter devices thereof in synchronism with the motion of the control lever. Such remote control devices in the prior art, however, give no indication at the control station of the actual position of the gearing, nor of the resistance being offered to the shifting movement, with the result that the driver of the vehicle is apt to clash and jam the gears during the shifting operation.

It is accordingly an object of the present invention to provide a remote control system of the above type which will indicate to the driver the position, and resistance to shifting, of the gearshift mechanism.

Another object is to limit the movement of the control lever ahead of synchronism with respect to the movement of the transmission mechanism, so that the position of the lever will substantially indicate the position of the transmission mechanism.

Another object is to provide means for causing the control lever to oppose operation by the driver with a force proportional to the resistance offered by the gearshift mechanism to the follow-up motor, whereby the driver may "feel" such resistance.

Still another object is to provide a novel mechanism of the above character in which the follow-up motor is operated by a compressible fluid medium.

A further object is to provide, in a device of the above character, a novel structure associating the control means and fluid pressure motor whereby the synchronous movement of such parts may be adjusted with respect to each other, whereby compensation may be readily effected for wear.

The above and further objects and novel features of the invention will more fully appear from the following description when taken in connection with the accompanying drawing. It is to be expressly understood, however, that the drawing is for purposes of illustration only, and is not designed as a definition of the limits of the invention, reference being had for this purpose to the appended claims.

In the drawing, wherein like reference characters refer to like parts throughout the several views:

Fig. 1 is a perspective view, partly in section, of a gearshift operating system constructed in accordance with the present invention, and Fig. 2 is a detail view, in section, of the control lever shown in Fig. 1.

Referring to Fig. 1, a remote gearshift control embodying the present invention is shown therein as including a driver-operated control lever 3, a shifter bar 4 of any suitable remotely-positioned transmission mechanism, and a pneumatic motor 5 connected to the shifter bar and adapted to shift the same in synchronism with the motion of the control lever. Pneumatic pressure, as for example air under pressure, from a reservoir 6 is supplied to the motor 5 to cause it to follow up the motion of the control lever by means of a pair of valves 7 and 8 which may be selectively operated by said lever 3 through a suitable differential mechanism 9, the latter also serving to connect the control lever and a repeater motor 10 operating in synchronism with the shifter bar 4. As will appear more fully hereinafter, the valves 7 and 8 are of the reactive type and oppose the operation of the control lever 3 with a force proportional to the resistance encountered by the motor 5 in shifting the gears, so as to apprise the driver of such resistance.

The aforementioned differential mechanism 9 interposed between the control lever 3, the repeater motor 10 and the valves 7 and 8 more particularly includes a rocking fulcrum member 11 pivoted upon a fixed pin 12 and adapted to be rocked in synchronism with the motion of the shifter bar 4 by means of the repeater motor 10. The latter, as shown, is provided with a piston rod 14 having a portion thereof formed as a rack 13 which drivably engages a pinion 15 carried by cross shaft 16. A worm 17 carried by said shaft is adapted to rock the member 11 through a worm sector 18 preferably formed integrally with the fulcrum member. The lever 3 is pivoted intermediate its ends upon a fulcrum pin 19 secured to the member 11, so as to be relatively movable with respect thereto, such relative movement being limited by a lost motion connection provided by the engagement of an eyelet 20, formed in the lower end of the lever, with the pivot pin 12 which it loosely surrounds.

Means are provided whereby such relative movement of the lever 3 upon the fulcrum member 11 will selectively actuate the valves 7 and 8 in order to move the shifter bar in opposite directions. As shown, such means include an annular flange 21 at the lower end of the lever concentric with the eyelet 20, and carrying a head 22 formed on a valve-actuating rod 23. It will be apparent that with such an arrangement, if the lever 3 is rotated upon the pin 19 in a clockwise direction with respect to the fulcrum member 11, Fig. 1, the flange 21 and rod 23 will be moved to the left, and conversely, if the lever is rotated counterclockwise, the valve-actuating rod will be moved to the right. It will further be noted that should the rocking fulcrum member 11 follow up any such movement of the control lever so as to become again aligned with the control lever, the valve-actuating rod will be brought back to its normal central position.

The valves 7 and 8 more particularly include a fixed bracket 25 through which stems 26 project upwardly to be operatively engaged by a rocker arm 27 pivoted at 28 and operated by rod 23 through a suitable connection 29. In the event the rod 23 is shifted to the right, the rocker arm 27 will be rocked in a clockwise direction to actuate the valve 8, while shifting of the rod to the left will effect operation of valve 7.

As before stated, the valves 7 and 8 are of the reactive type, and each comprises a supply conduit 30 extending from the reservoir 6, and exhaust conduit 31, a motor energizing connection 32 and a control stem 26, depression of which will cause fluid pressure to be admitted from the supply conduit 30 to the motor connection 32. Release of the control stem will cut off the supply conduit 30 from the motor connection 32 and exhaust the latter through the exhaust passage 31. A reactor piston 34 is formed on each valve control stem and is subjected on its lower side to the pressure admitted to the motor conduit 32 so as to apply an upward thrust or reaction to the control stem 26 which will resist the operation thereof with a force proportional to said motor conduit pressure, this resistance being reflected back through the mechanism 9 to the lever 3 so as to be felt by the driver as opposing manual operation of the lever.

Pneumatic pressure from the valves 7 and 8 is supplied respectively through the motor conduits 35 and 36 to opposite ends 37 and 38 of the pneumatic motor 5, which more particularly includes a cylinder 39, a piston 40 sliding therein, and a piston rod 41 secured to the piston and carrying the shifter bar 4. Admission of fluid pressure through the conduit 36 to the left-hand end 38 of the cylinder will thrust the piston 40 and shifter bar 4 to the right, while admission of fluid through the conduit 35 will thrust the shifter bar to the left. In each case, the pressure in one of the conduits 35 or 36 will react upon the stem of one of the reactive valves and will be experienced by the operator in operating the control lever 3, thus apprising the operator of the degree of power steering.

The motion of the shifter bar 4 is reproduced in the rocking repeater member 11 by means of a telemotor system which includes a transmitter valve 42 actuated by a cam rider 43 which bears against a conical cam 44 either formed on the shifter bar or longitudinally adjustable thereon, as by means of threaded portion 44ª and lock nut 44ᵇ. The transmitting valve is of the self-lapping type and in general comprises a supply conduit 45, a transmitting conduit 46, an exhaust port 47 and a controlling stem 48, the vertical position of the stem regulating the pressure in the transmitting conduit 46, the pressure increasing as the stem 48 thrust upwardly by the cam 44 and again decreasing as the cam permits the stem to descend under the action of a graduating spring 49. Since the position of the shifter bar 4 and cam 44 determines the position of the stem 48, it will also control the intensity of the pressure in the transmitting conduit 46. The receiving means in the repeater telemotor system comprises the pressure-measuring repeater motor 10 which includes a cylinder 50, a piston 51 sliding therein and thrust to the left by fluid pressure from the conduit 46, and a calibrated spring 52 for opposing this pressure-induced motion of the piston. The equilibrium position of the piston within the cylinder will obviously depend upon the pressure in the conduit and consequently upon the position of the shifter bar. Thus as the shifter bar moves to the left, the repeater motor piston will also move to the left, and vice versa, so that the repeater motor proportionately reproduces the motion of the shifter bar.

It will be noted that the cam 44 has been formed as a cone upon the shifter bar. This permits the shifter bar to be rocked about its longitudinal axis without affecting the transmitter valve stem 48 so that the shifter finger 51 may be rocked by any suitable means, not shown, to select any gear it is desired to shift.

In operation, and assuming that the driver wishes to move the shifter bar 4 to the right in Fig. 1, the lever 3 is rocked in a counterclockwise direction, and since the fulcrum 19 is momentarily stationary, the rod 23 will be moved to the right, operating the valve 8. This will admit fluid pressure to the left hand end 38 of the cylinder 39, thrusting the shifter bar 4 to the right so as to follow the motion of the lever 3. Such motion is repeated and transmitted back to the control station by the member 11 which rocks in a counterclockwise direction in pursuit of the motion of the lever 3. As long as the lever is displaced in a counterclockwise direction with respect to the fulcrum member, the valve 8 will continue to be actuated, but in the event the control lever is held in any one position and the fulcrum member becomes aligned therewith, the rod 23 will be neutralized and the valve 8 will be lapped. Conversely, if the driver rocks the control lever in a clockwise direction, the valve 7 will be actuated and the shifter bar 4 will be moved to the left. It will thus be seen that the shifter bar will exactly follow and reproduce the motion of the control lever.

Throughout the above action, it will be noted that the control lever resists motion by the driver with a force proportional to the force being exerted by the pneumatic motor. For example, when the driver rocks the lever 3 in a counterclockwise direction so as to shift the shifter bar to the right, the stem of the valve 8 will be depressed to admit pressure to the conduit 36 and the end 38 of the cylinder 39. As this pressure builds up, the stem 26 will react upwardly against the rocker arm 27, thrusting the connecting rod 23 and the lower end 21 of the gearshift lever to the left. This will tend to produce a clockwise moment upon the lever proportional to the pressure in the conduit and to the force being exerted by the pneumatic motor, which will be experienced by the driver as resisting his operation of the lever 3. A corresponding reaction will obviously be felt by the driver when shifting the control lever in a clockwise direction.

In the event that movement of the shifter bar 4 is arrested for some reason, the continued operation of the control lever will be arrested by the abutment of the eyelet 20 against the pivot pin 12. The irreversible worm and sector connection 17, 18 will prevent the fulcrum member 11 from being carried along by the operation of the lever 3 and will prevent disturbance of the repeater motor system.

There has thus been provided by the present invention a telemotor system for remotely operating transmissions or other devices and utilizing a compressible fluid for securing a synchronous control. In utilizing air under pressure, it will be readily understood that the control station may be located at a distance from the actuated device. However, the use of the pressure-transmitting valve controlled by the position of the shifter motor, in combination with the repeater motor and connection therewith to the control lever, enables synchronous operation of the movements of the control lever and shifter motor at all times. Thus, within close limits, the position of the control lever will indicate the position of the shifter motor, a highly desirable feature in remote control systems.

While there has been shown and described only one form of the invention, it is to be expressly understood that the same is not limited thereto but may be embodied in various forms. Various changes in the shapes and sizes of the various parts may likewise be made without departing from the spirit of the invention, as will be apparent to those skilled in the art. Reference will, therefore, be had to the appended claims for a definition of the limits of the invention.

What is claimed is:

1. A telemotor system comprising a manually-operable control member, an actuated member adapted to reproduce the motion of the control member, and means for controlling the movement of said actuated member in accordance with the motion of the control member comprising a motor operatively connected to said actuated member, means operable by said control member for controlling said motor, a repeater motor operatively associated with said actuated member for transmitting the motion of the latter to a point adjacent said control member, and mechanism operatively connecting said control member, repeater motor and motor-controlling means for actuating said control member in accordance with the relative displacement between said control member and said repeater motor, said mechanism including means for preventing direct actuation of the repeater motor by the control member.

2. A telemotor system comprising a manually-operable master control member, a movable lever, means for pivotally mounting said member on said lever, an actuated member adapted to reproduce the motion of the control member, and means for controlling the movement of said actuated member in accordance with the motion of said control member comprising a motor operatively connected to said actuated member, means operable by said control member for controlling said motor, a repeater motor operatively associated with said actuated member for transmitting the motion of the latter to said movable lever and mechanism operatively connecting the control member and the repeater motor including means for preventing direct actuation of the repeater motor by the control member.

3. A telemotor system comprising a manually-operable control member, an actuated member adapted to reproduce the motion of the control member, and means for controlling said actuated member in accordance with the motion of the control member comprising a motor operatively connected to said actuated member, means operable by said control member for energizing said motor including mechanism adapted to be actuated by said control member and connected thereto to resist actuation thereof with a force proportional to the force exerted by said motor upon said actuated member, a repeater motor operatively associated with said actuated member for transmitting the motion of the latter to a point adjacent said control member, and mechanism operatively connecting said control member, repeater motor and motor-energizing means for actuating said control member in accordance with the relative displacement between said control member and said repeater motor, the connection between said repeater motor and said latter mechanism including means for preventing direct actuation of the repeater motor by the control member.

4. A telemotor system comprising a manually-operable master control member, a remotely-positioned actuated member adapted to reproduce the motion of the master member, and means for impressing the motion of the master control member upon said actuated member comprising a source of compressed air, a fluid motor adapted to be operated by said compressed air, valve means operable by said control member to admit compressed air to said motor, a fluid-operated repeater motor, valve means operable by said actuated member for transmitting compressed air to said repeater motor, the pressure of the air transmitted being proportional to the extent of movement of said actuated member, and mechanism interposed between said master control member, said first named valve means, and said repeater motor for enabling operation of said first named valve means during initial movement of said master control member independently of said repeater motor, said mechanism including connections between said repeater motor and said first named valve means for rendering the latter inoperative when movement of said actuated member to a degree proportional to the initial movement of said control member has been completed, said mechanism also including means for preventing direct actuation of the repeater motor by the control member.

5. A telemotor system comprising a manually-operable master control member, a follower member adapted to reproduce the motion of the master member, and means for impressing the motion of the master control member upon said follower member comprising a source of fluid under pressure, a reactive valve for controlling the flow of said fluid, means for connecting said valve and said control member, a fluid motor adapted to be operated by said fluid from said valve and connected to said follower member to actuate the same, a repeater motor connected to said follower member for transmitting the motion of said follower member to a point adjacent said master control member, and mechanism interposed between said master control member, said connecting means, and said repeater motor for enabling actuation of said valve in accordance with the difference in the motion of said master control member and said repeater motor, said mechanism including a worm mechanism between the control member and the repeater motor.

6. A telemotor system comprising a manually-operable master control member pivotally mounted upon a movable fulcrum member, a follower member adapted to reproduce the motion of the master control member, and means for impressing the motion of the master control member upon said follower member comprising a source of fluid under pressure, a reactive valve for controlling the flow of said fluid, a link pivoted at one end to said master control member and connected to the valve to actuate the same, a fluid motor adapted to be operated by fluid under pressure from said valve and connected to said follower member to actuate the same, a repeater motor connected to said follower member for transmitting the motion of said follower member to said movable fulcrum member, and means connecting said fulcrum member and repeater motor for preventing direct actuation of the latter by the former.

7. A telemotor system comprising a manually-operable master control member pivotally mounted upon a movable fulcrum member, a follower member adapted to reproduce the motion of the master control member, and means for impressing the motion of the master control member upon said follower member comprising a source of fluid under pressure, a reactive valve for controlling the flow of said fluid, a link pivoted at one end to said master control member and connected to the valve to actuate the same, a fluid motor adapted to be operated by fluid under pressure from said valve and connected to said follower member to actuate the same, a repeater motor connected to said follower member for transmitting the motion of said follower member to a point adjacent said movable fulcrum member, and a worm gearing between said repeater motor and said movable fulcrum member for preventing direct actuation of the repeater motor by the fulcrum member.

8. A telemotor system comprising a manually-operable master control member, a follower member adapted to reproduce the motion of the master member, and means for impressing the motion of the master control member upon said follower member comprising a source of fluid under pressure, a valve for controlling the flow of said fluid, means connecting said valve and member, a fluid motor adapted to be operated by fluid under pressure from said valve and connected to said follower member to actuate the same, a second fluid motor also adapted to be operated by means of fluid under pressure from said valve, and connected thereto to resist actuation thereof with a force proportional to the force exerted by said first motor upon said follower member, a repeater motor connected to said follower member for transmitting the motion of said follower member to a point adjacent said master control member, and mechanism interposed between said master control member, said valve, and said repeater motor for actuating said valve in accordance with the difference in the motion of said master control member and said repeater motor, said mechanism including a connection between said repeater motor and said control member containing means for preventing actuation of the repeater motor by the control member.

9. A telemotor system comprising a manually-operable master control member, a movable member, means for pivotally mounting said control member on said movable member for limited movement with respect thereto, an actuated member adapted to reproduce the motion of the master control member, and means for impressing the motion of the master control member upon said actuated member comprising a source of power, a shiftable control element for controlling said power, a link pivoted at one end to said master control member and at the other to said control element, a motor adapted to be energized by means of power from said control element and connected to said actuated member to actuate the same, a repeater motor operatively associated with said actuated member for transmitting the motion of the latter to said movable member, a worm gearing between said repeater motor and said movable member for preventing direct actuation of the repeater motor by the movable member, and means for limiting the pivotal movement of said master control member with respect to said movable member.

10. A telemotor system comprising a manually-operable master control member pivotally mounted upon a movable fulcrum member, a follower member adapted to reproduce the motion of the master member, and means for impressing the motion of the master control member upon said follower member comprising a source of fluid under pressure, a reactive valve for controlling the flow of said fluid, a link pivoted at one end to said master control member and connected to the valve to actuate the same, a fluid motor adapted to be operated by said fluid from said valve and connected to said follower member to actuate the same, a repeater motor connected to said follower member for transmitting the motion of said follower member to said movable fulcrum member and preventing direct actuation of the repeater motor by the fulcrum member, and means for limiting the pivotal movement of said master control member upon said fulcrum member.

11. A repeater system for indicating the position of the shifter member of a gearshift mechanism comprising a substantially conical cam secured to the shifter member, a cam follower riding on said cam, a source of fluid pressure, a graduated valve connected to said source of fluid pressure, actuated by said cam follower and adapted to transmit said fluid pressure in accordance with the position of said cam follower, and a motor remote from said valve and connected to said valve.

12. The combination with a repeater motor according to claim 11 of a member to be operated thereby, and an irreversible connection between the motor and the member.

13. In a remote controlling system having a member to be actuated, a master controlling element, a motor operatively connected with said member and adapted to be energized by air under pressure, valve means for controlling the application and release to and from said motor, means operatively connecting said valve means and controlling element, a repeater motor operatively associated with said controlling element and adapted to be operated by air under pressure, means connecting said repeater motor and element preventing direct actuation of the former by the latter, and means governed by the extent of movement of said first named motor for graduating the pressure of the air admitted to said repeater motor.

WILFRED A. EATON.